June 16, 1925.  1,542,342
P. DOCTOR
LUGGAGE CARRIER
Filed May 20, 1924   2 Sheets-Sheet 1
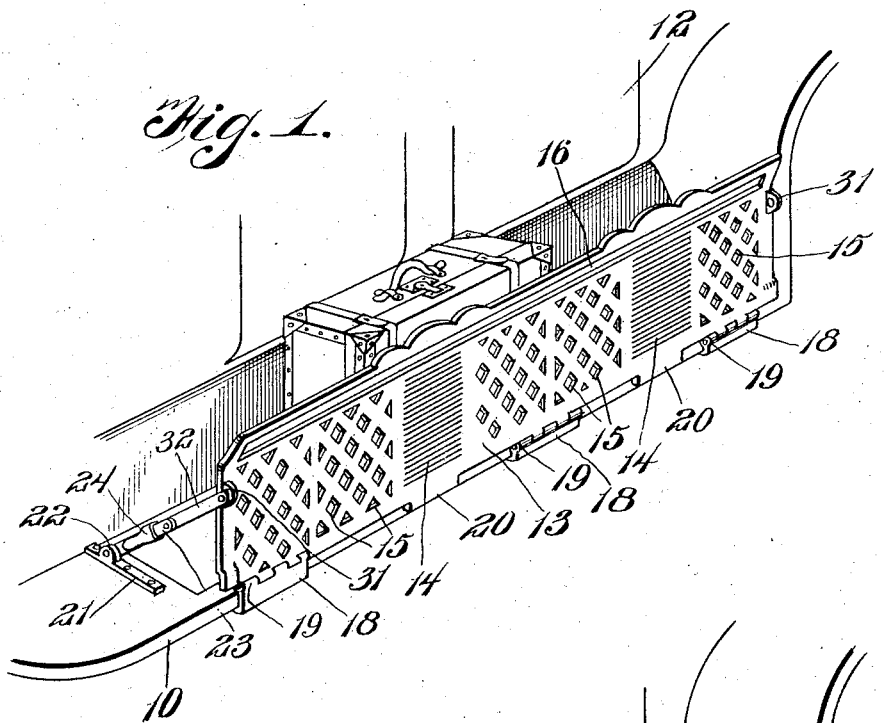
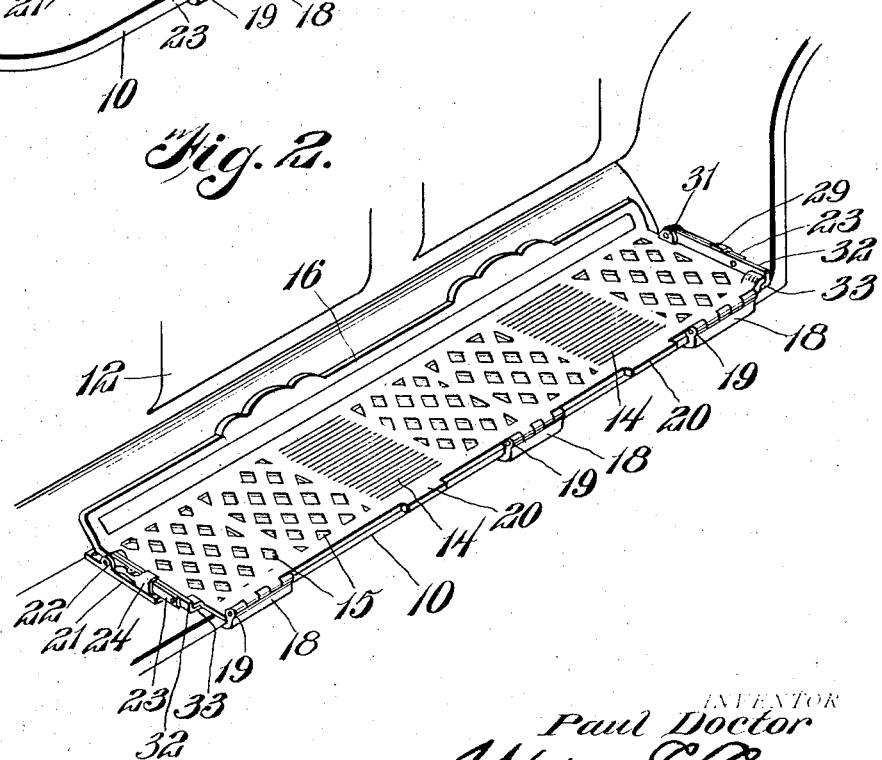
INVENTOR
Paul Doctor
Watson E. Coleman
ATTORNEY June 16, 1925.
P. DOCTOR
LUGGAGE CARRIER
Filed May 20, 1924    2 Sheets-Sheet 2
1,542,342
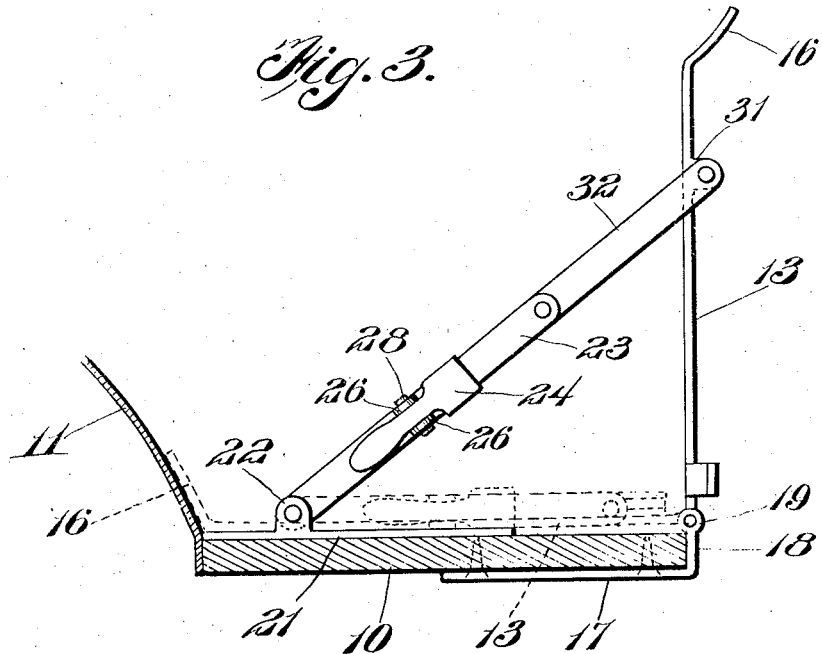
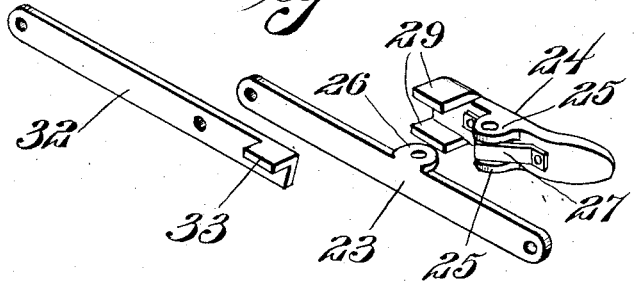
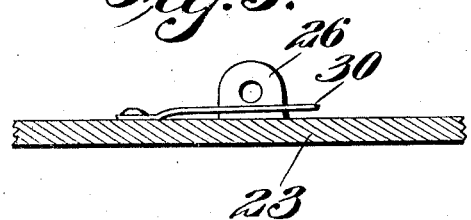
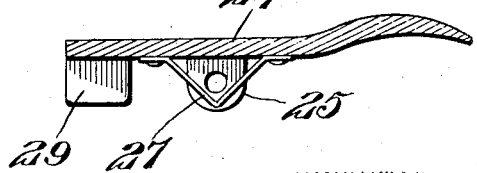
INVENTOR
Paul Doctor
Watson E. Coleman
ATTORNEY Patented June 16, 1925.

1,542,342

UNITED STATES PATENT OFFICE.

PAUL DOCTOR, OF DENVER, COLORADO.

LUGGAGE CARRIER.

Application filed May 20, 1924. Serial No. 714,650.

*To all whom it may concern:*

Be it known that I, PAUL DOCTOR, a citizen of the United States, residing at Denver, in the county of Denver and State of Colorado, have invented certain new and useful Improvements in Luggage Carriers, of which the following is a specification, reference being had to the accompanying drawings.

This invention relates to running board luggage carriers for vehicles.

An important object of the invention is to provide a running board luggage carrier which is permanently attached to the running board and which when not in use as a luggage carrier serves as a tread plate for the running board.

A further object of the invention is to provide a device of this character which, in addition to serving as a tread plate, likewise serves as a guard for the running board fender preventing marring thereof by contact with the feet.

A still further object of the invention is to provide novel and improved means for securing the luggage carrier in each of its adjusted positions.

These and other objects I attain by the construction shown in the accompanying drawings, wherein for the purpose of illustration is shown a preferred embodiment of my invention and wherein:—

Figure 1 is a perspective view of a luggage carrier constructed in accordance with my invention, showing the same in the position in which it acts to hold luggage in place upon the running board;

Figure 2 is a similar view with the carrier in place to act as a tread plate;

Figure 3 is a side elevation of the carrier, the carrier being shown in open position in full line and in closed position in dotted lines;

Figure 4 is a combined perspective of the sections of the supports;

Figure 5 is a detail sectional view through one arm of the support;

Figure 6 is a sectional view through the latch.

Referring now more particularly to the drawings in which the numeral 10 designates the running board of a vehicle and 11 the running board fender closing the gap between the running board and body 12 of the vehicle, the carrier comprises a metallic plate 13 pivoted along one edge thereof to the running board. This plate is of the same width as the running board and is roughened or corrugated in alignment with the doors of the vehicle, as indicated at 14, to provide an anti-slipping tread for use by persons leaving or entering the automobile when the device is employed as a tread plate. The remainder of the plate can be provided with perforations 15 for the purpose of lightening and ornamenting the same if so desired. The free edge of the plate is provided with a curved and preferably ornamented flange 16 which when the plate is in position upon the upper face of the running board lies against and conforms to the shaping of the running board fender 11, extending upwardly thereon a sufficient distance to prevent damage to the running board fender by persons leaving or entering the automobile.

The manner of pivotally connecting the plate 13 to the running board will be necessarily modified with different makes of vehicles. In the majority of constructions the form of attachment illustrated will be employed. This consists of a hinged plate 17 secured to the under surface of the running board and having at its outer edge an upwardly extending flange 18 upon which the pintle eyes 19 of one side of the hinge are formed, the remaining pintle eyes being formed on the edge of the plate 13. A plurality of these plates 17 will be distributed along the length of the plate 13. The plate 13 is preferably provided upon the hinged edge thereof with extensions 20 forming stop lugs engaging the outer face of the running board to limit the movement of the plate 13 when the same is vertical.

To the running board at each end of the plate in parallel relation to the edge of the plate when the plate is in position upon the upper surface of the running board are supports 21 extending transversely of the running board and having adjacent their inner ends an upstanding lug 22. Pivoted to these lugs are links 23 to which are pivoted intermediate the ends thereof latches 24. Each latch 24 is in the form of a lever provided approximately centrally thereof with a pair of ears 25 pivoted to similar ears 26 formed on the links 23. Between the ears 25 the lever has secured thereto a V-shaped piece of metal 27 which straddles a pintle 28 connecting the ears 25 and 26. The end of this lever is of the same width as the link 23 and is provided upon the face thereof next adjacent the lever with flanges 29 each of a length equal to at least twice the thickness of the link. To each link 23 adjacent the ears 26 thereof is secured one end of a spring 30 the free end of which extends between the ears 26 in spaced relation to the link. These springs coact with the V-shaped metal strip 27 to hold the lever either in latching or releasing position. In the latching position the edges of the flanges 29 project beyond the face of the links remote from the ears 26 and in the releasing position they are withdrawn from such projection. Pivoted at one end to lugs 31 formed upon the plate 13 adjacent the free edge thereof are further links 32 which intermediate their ends are pivoted to the free ends of the links 23. These links align with the links 23 when the plate 13 is in either of its positions and are held against movement with relation to the links 23 by the latches 24. The free ends of the links 32 are preferably provided with an angular flange portion 33 projecting beneath the plate 13 when in position for use as a tread plate. This construction permits coincidence of the pivots connecting the links 23 to the running board and the links 32 to the plates 13 when the plates 13 are in position for use as tread plates and assures against shifting and rattling movement of these links while in this position.

It will be obvious that many changes are possible in the construction hereinbefore set forth without in any manner departing from the spirit of my invention and I accordingly do not limit myself to such specific structure except as hereinafter claimed.

I claim:—

1. In a running board luggage carrier for vehicles, a plate of the same width as the running board adapted to be permanently pivotally connected to the outer longitudinal edge of the running board and swingable about the pivots thereof to a position flatly engaging the upper surface of the running board or to a position vertically aligned with the edge of the running board to which it is attached, means for locking the plate in either of said positions, comprising a link pivoted to the plate, a link pivoted to the running board and pivotally connected with the first named link, the adjacent ends of said links having overlapped portions, and a latch pivoted to one of said links and having arms positionable to engage the other of said links to maintain the links in alignment one with the other.

2. In a running board luggage carrier for vehicles, a plate of the same width as the running board adapted to be permanently pivotally connected to the outer longitudinal edge of the running board and swingable about the pivots thereof to a position flatly engaging the upper surface of the running board or to a position vertically aligned with the edge of the running board to which it is attached, means for locking the plate in either of said positions, comprising a link pivoted to the plate, a link pivoted to the running board and pivotally connected with the first named link, the adjacent ends of said links having overlapped portions, a latch pivoted to one of said links and having arms positionable to engage the other of said links to maintain the links in alignment one with the other, said latch being withdrawable to permit pivotal movement of the links, and means for maintaining said latch in the first named or in the last named position.

In testimony whereof I hereunto affix my signature.

PAUL DOCTOR.